US 6,639,757 B2

(12) United States Patent
Morley et al.

(10) Patent No.: US 6,639,757 B2
(45) Date of Patent: Oct. 28, 2003

(54) HEAT DISSIPATION STRUCTURES FOR INTEGRATED LEAD DISK DRIVE HEAD SUSPENSIONS

(75) Inventors: Catherine A. Morley, Lester Prairie, MN (US); Todd A. Krinke, Rockford, MN (US); John H. Tangren, St. Paul, MN (US)

(73) Assignee: Hutchinson Technology Inc., Hutchinson, MN (US)

( * ) Notice: Subject to any disclaimer, the term of this patent is extended or adjusted under 35 U.S.C. 154(b) by 59 days.

(21) Appl. No.: 09/757,545

(22) Filed: Jan. 10, 2001

(65) Prior Publication Data

US 2002/0089791 A1 Jul. 11, 2002

(51) Int. Cl.[7] .............................................. G11B 21/16
(52) U.S. Cl. ................................. 360/245.9; 360/244.1
(58) Field of Search .......................... 360/245.9, 245.5, 360/244.3, 240, 264.2, 245.4, 244.1

(56) References Cited

U.S. PATENT DOCUMENTS

| 4,394,530 A | | 7/1983 | Kaufman |
| 4,410,927 A | | 10/1983 | Butt |
| 4,684,975 A | | 8/1987 | Takiar et al. |
| 4,827,376 A | | 5/1989 | Voss |
| 4,858,073 A | | 8/1989 | Gregory |
| 5,014,145 A | | 5/1991 | Hosokawa et al. |
| 5,245,489 A | | 9/1993 | Kimura et al. |
| 5,371,404 A | | 12/1994 | Juskey et al. |
| 5,737,152 A | * | 4/1998 | Balakrishnan ............ 360/245.9 |
| 5,796,552 A | * | 8/1998 | Akin, Jr. et al. ......... 360/264.2 |
| 5,812,344 A | * | 9/1998 | Balakrishnan ............ 360/245.9 |
| 5,846,442 A | | 12/1998 | Pasco |
| 5,924,187 A | | 7/1999 | Matz |
| 6,084,746 A | * | 7/2000 | Shiraishi et al. ......... 360/245.9 |
| 6,134,075 A | * | 10/2000 | Bennin et al. ........... 360/245.9 |
| 6,144,530 A | | 11/2000 | Shiraishi et al. |
| 6,249,404 B1 | * | 6/2001 | Doundakov et al. ..... 360/245.4 |

FOREIGN PATENT DOCUMENTS

| EP | 0 588 491 A2 | 3/1994 |
| JP | 63-292412 | 11/1988 |
| JP | 11-195215 | 7/1999 |
| JP | 2000311324 | 11/2000 |

* cited by examiner

Primary Examiner—Allen Cao
(74) Attorney, Agent, or Firm—Faegre & Benson, LLP (57) ABSTRACT

A head suspension or head suspension component that includes a spring metal support layer, an insulating layer and a conductive layer, into which three dimensional heat dissipation structures have been integrally formed to dissipate heat from the head suspension, especially in an area adjacent to an integrated circuit mounted on the head suspension. The heat dissipation structures may include a plurality of heat fins formed into or onto one or more conductive traces of the conductive layer, or may include a plurality of projections or indentations formed into or onto conductive traces. Use of a partial etching technique allows for simultaneous etching of both the traces and the heat fins within the traces, thereby decreasing production costs and increasing head suspension reliability. Heat fins may also be formed into the support layer in a region adjacent to the conductive layer heat fins, if desired in order to dissipate even more heat from the region.

42 Claims, 8 Drawing Sheets

HEAT DISSIPATION STRUCTURES FOR INTEGRATED LEAD DISK DRIVE HEAD SUSPENSIONS

FIELD OF THE INVENTION

This invention relates to structures for the dissipation of heat generated by integrated circuits mounted on integrated lead head suspensions.

BACKGROUND OF THE INVENTION

Head suspensions are well known and commonly used within dynamic magnetic or optical information storage devices or drives with rigid disks. The head suspension is a component within the disk drive that positions a magnetic or optical read/write head over a desired position on the storage media where information is to be retrieved (read) or transferred (written). Head suspensions for use in rigid disk drives typically include a load beam that generates a spring force and that supports a flexure to which a head slider having a read/write head is to be mounted. Head suspensions are normally combined with an actuator arm or E-block to which a mounting region of the load beam is mounted with a base plate so as to position (by linear or rotary movement) the head suspension, and thus the head slider and read/write head, with respect to data tracks of the rigid disk. The rigid disk within a disk drive rapidly spins about an axis, and the head slider is aerodynamically designed to "fly" on an air bearing generated by the spinning disk.

Control of the read/write head of a head suspension is typically handled by electronic circuitry within the disk drive. However, the use of electronic components, such as an integrated circuit chip (IC chip), for signal amplification or other purposes closer to the read/write head is also sometimes desired. In order to shorten the lead length between the read/write head and the IC chip, it has become well know to mount the IC chip on a tail in close proximity to the head suspension or even directly onto the head suspension. However, because of the close proximity of the IC chip to the head suspension, heat generated by the chip can cause problems with the structure and performance of the suspension, as well as the IC chip.

A number of methods and/or structures for dissipating heat from an IC chip, or compensating for differences in thermal expansion between the chip and the suspension, have been tried. These include the use of heat sinks or fins mounted to the IC chip or to the suspension opposite the IC chip, the use of heat dissipating metal tape leads, and the mounting of the IC chip in an opening formed within the suspension with minimal connection between the two. Mounting of the IC chip on the side of the suspension toward the disk also is known to increase heat dissipation because of the increased air flow over and around the chip during operation of the disk drive. Each of these methods and/or structures has its benefits and drawbacks. Thus, an ongoing need exists for improvements in heat dissipation for IC chips mounted on head suspensions.

SUMMARY OF THE INVENTION

The present invention is a head suspension or head suspension component that includes a spring metal support layer, an insulating layer and the conductive layer, having three dimensional heat dissipation structures that are integrally formed within the conductive layer. The head suspension or head suspension component also includes conductive traces formed within the conductive layer onto which an integrated circuit is mounted. The heat dissipation structures may be configured as heat fins having side walls separated by valleys formed within at least one of the conductive traces. The heat dissipation structures may be located in the traces adjacent the integrated circuit. In addition, heat dissipation structures may also be formed integrally within the support layer adjacent the conductive heat dissipation structures and/or the integrated circuit. Use of a partial etching technique allows for simultaneous etching of both the traces and the heat fins within the traces, thereby decreasing production costs and increasing head suspension reliability.

DETAILED DESCRIPTION OF THE INVENTION

Figure 1:
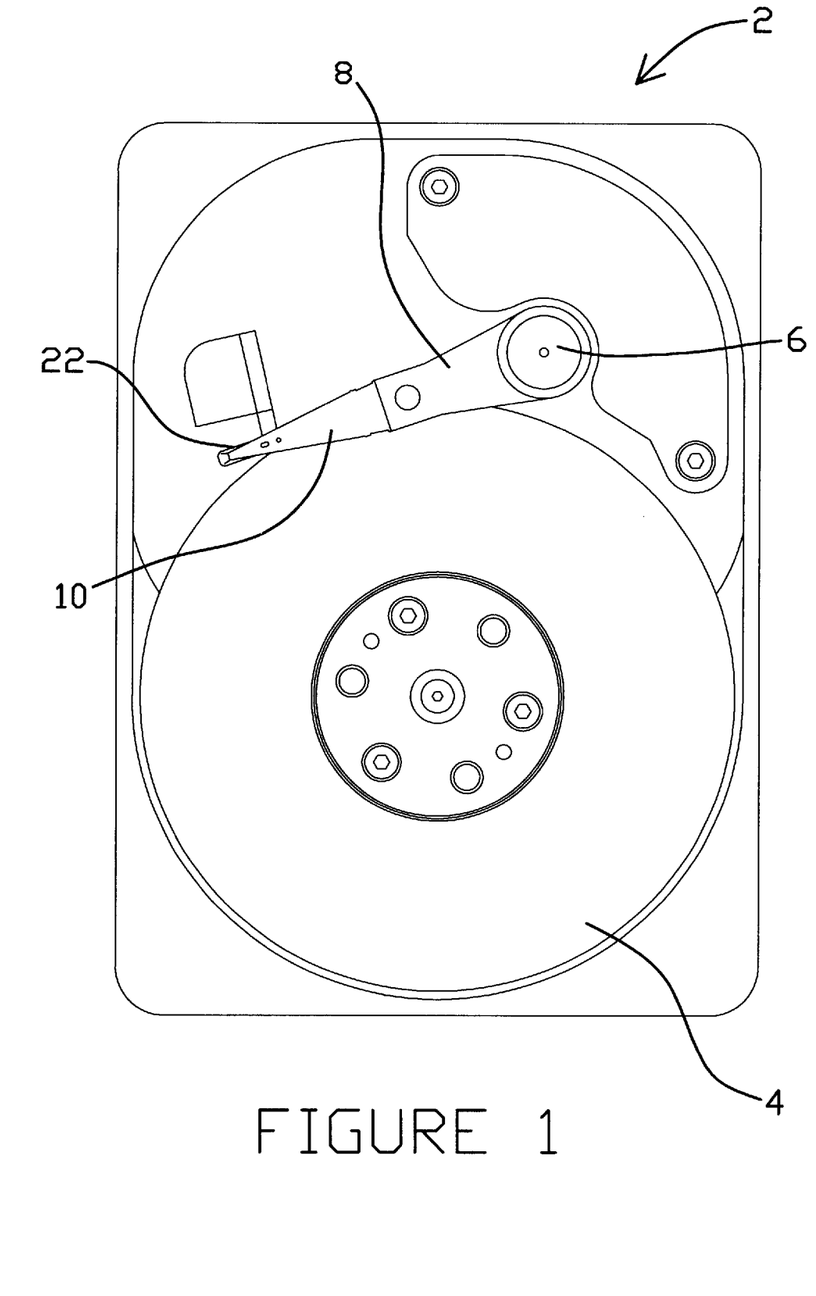
FIG. 1 is a plan view of a representative disk drive including a head suspension.

With reference to the attached Figures, it is to be understood that like components are labeled with like numerals throughout the several Figures. FIG. 1 is an embodiment of a disk drive 2 having a head suspension 10 suspended over a disk 4. Head suspension 10 supports a head slider 22 at its distal end over the disk 4. Head suspension 10 is attached at its proximal end to an actuator arm 8, which is coupled to an actuator motor 6 mounted within disk drive 2. Actuator motor 6 is used to position the actuator arm 8, head suspension 10, and slider 22 over a desired position on the disk 4. In the embodiment shown, actuator motor 6 is rotary in nature, and operates to radially position the head suspension 10 and slider 22 over disk 4. Other actuator motors, such as a linear actuator motor, can of course be used.

In use, head slider 22 reads and/or writes data to and from disk 4 in disk drive 2, and the head suspension 10 supports and aligns the head slider 22 over a desired location on disk 4 in response to signals received from a microprocessor (not shown). Disk 4 rapidly spins about an axis, and an air bearing is created by rotating disk 4. Head slider 22 is aerodynamically designed to "fly" on the air bearing between the surface of the disk 4 and the head slider 22. As head slider 22 flies over the air bearing, it is urged away from the surface of the disk 4 by the air bearing. Head suspension 10 provides a gram load spring force that counteracts the force of the air bearing and urges the head slider 22 toward the surface of the disk 4. The point at which these two forces are balanced during operation is known as the "fly height" of the head slider.

Figure 2:
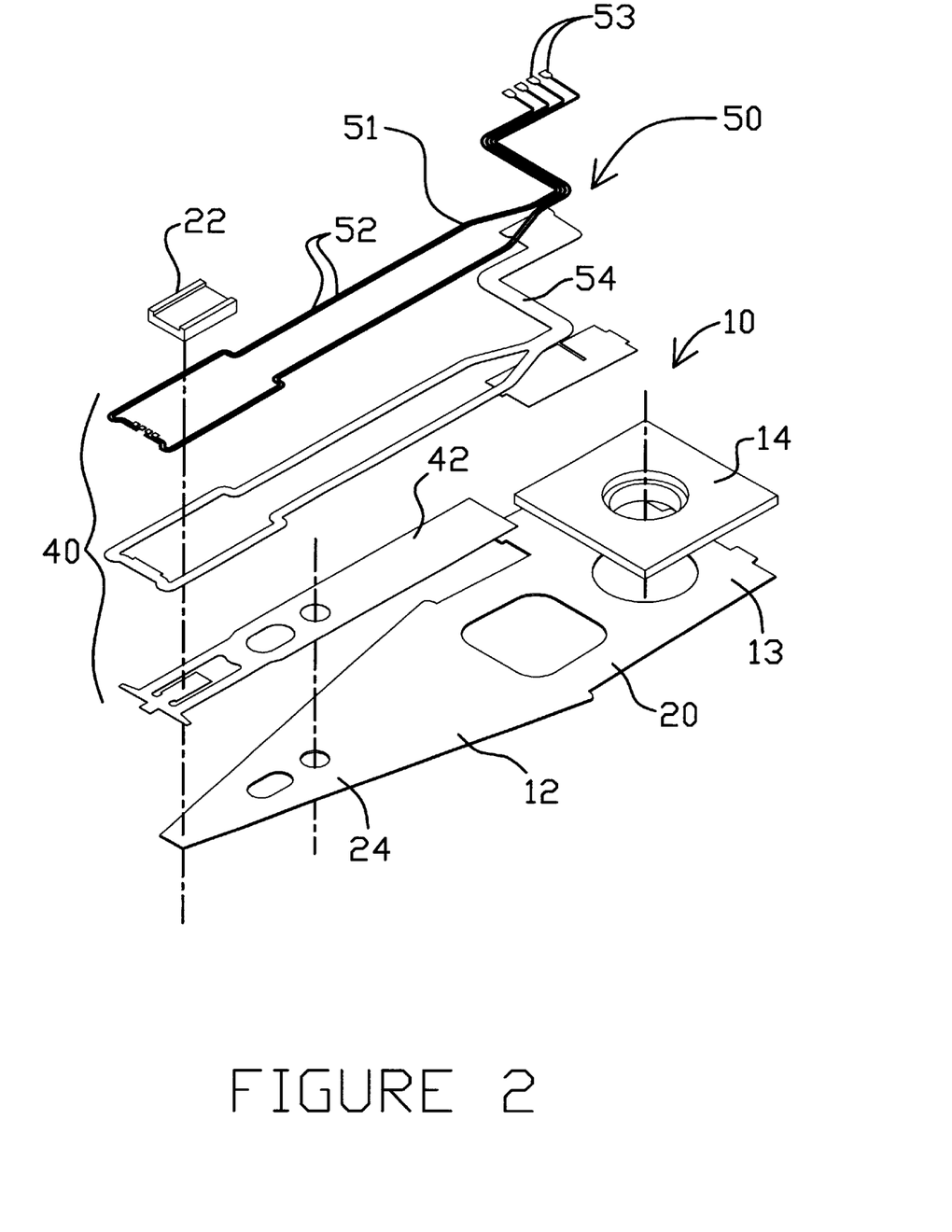
FIG. 2 is an expanded perspective view of one embodiment of a head suspension, as shown in FIG. 1, having a load beam, flexure and head slider.

As shown in greater detail in FIG. 2, head suspension 10 is comprised of a plurality of separate components that are mounted together. Head suspension 10 includes a load beam 12 to which a flexure 40 is mounted. Load beam 12 includes a mounting region 13 at the proximal end of the load beam 12, to which a base plate 14 is mounted. Mounting region 13 and base plate 14 are mounted to the actuator arm 8 of disk drive 2 in a known manner. Load beam 12 further includes a rigid region 24 at the distal portion of the load beam 12, and a spring region 20 located proximal of the rigid region 24 and distal of the mounting region 13.

Flexure 40 is mounted to the rigid region 24 of load beam 12 at flexure mounting region 42. Flexure 40 provides a resilient connection between head slider 22 and load beam 12, and is designed to permit head slider 22 to gimbal in response to variations in the air bearing generated by rotating disk 4. In the embodiment shown, flexure 40 includes a trace assembly 50 that provides electrical interconnection between slider 22 and a microprocessor (not shown) of disk drive 2 to convey read and write signals to and from head slider 22. The trace assembly 50 of the shown embodiment includes a conductive layer of material 51, such as copper, formed into longitudinal traces 52 that extend along the length of flexure 40, and an insulating layer of material 54 interposed between flexure 40 and the conductive layer 51. The trace assembly 50 is typically connected to other conductive traces or wires (not shown) that extend from the head suspension to the microprocessor of disk drive 2. The trace assembly 50 may include bonding pads 53 for connection to this separate set of conductive traces.

Figure 3:
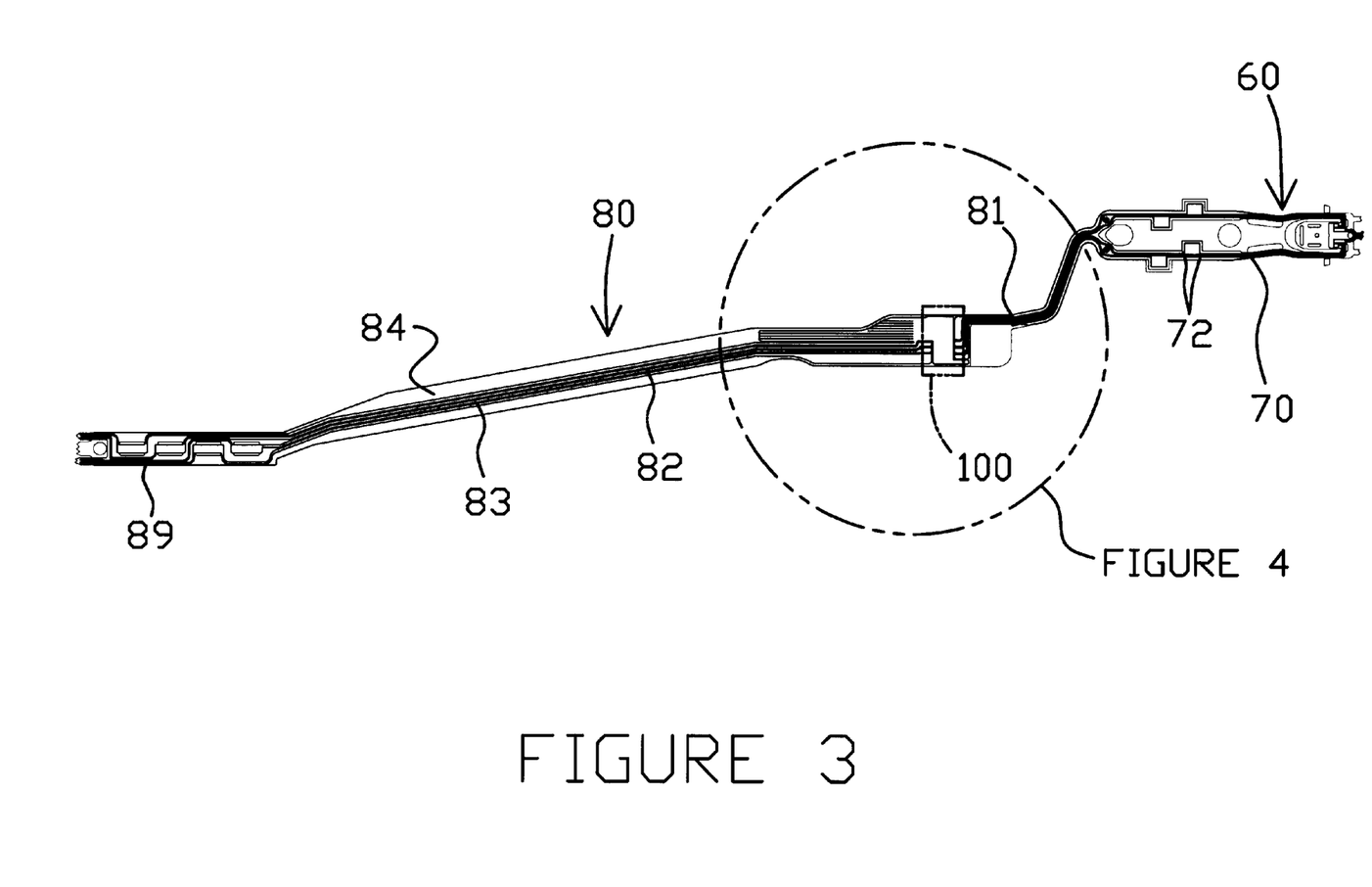
FIG. 3 is a plan view of another embodiment of a flexure including an elongated tail onto which an integrated circuit chip can be mounted.

Alternatively, as shown in another embodiment in FIG. 3, a flexure 60 may include a trace assembly 70 that continues into a tail 80 that is mounted or otherwise supported off of the head suspension (not shown) and connects the head slider (not shown) to the microprocessor or other remotely placed electronics. The tail 80 is preferably formed integrally with the trace assembly 70 from multiple layers, including a conductive layer 81, such as copper, formed into longitudinal traces 72 and 82. The conductive layer 81 may be supported by layer of insulating material 83 and a support layer, such as stainless steel layer 84. Optionally, but not shown, the tail 80 may be formed as a separate component that is then connected to the trace assembly 70 of flexure 60, such as at bonding pads 53 shown in FIG. 2.

Flexure 40 and flexure 60 (with or without tail 80) may be formed using many different methods, including attachment of separate layers, additive formation, such as material deposition, and subtractive formation from a multi-layer laminate. Preferably, however, the trace assemblies 50, 70 and tail 80 are formed by etching of at least the copper layer 51, 81 to produce the traces 52, 72, 82.

As stated above, in order to manage the signal put out by the head slider 22 at the end of the flexure, such as 40, electronic circuitry is usually required. Most of the necessary circuitry is typically mounted off of the head suspension 10 in another portion of the disk drive 2. However, with the ever decreasing size of the disk drive components, including the electronics, the need for signal amplification, modification and/or reading closer to the source of the signal, i.e., the head slider 22, becomes increasingly important. In order to accommodate this need, electronic components, such as integrated circuit chips ("chips"), may be mounted adjacent the conductive layer 51 between the head slider and related electronics.

Figure 4:
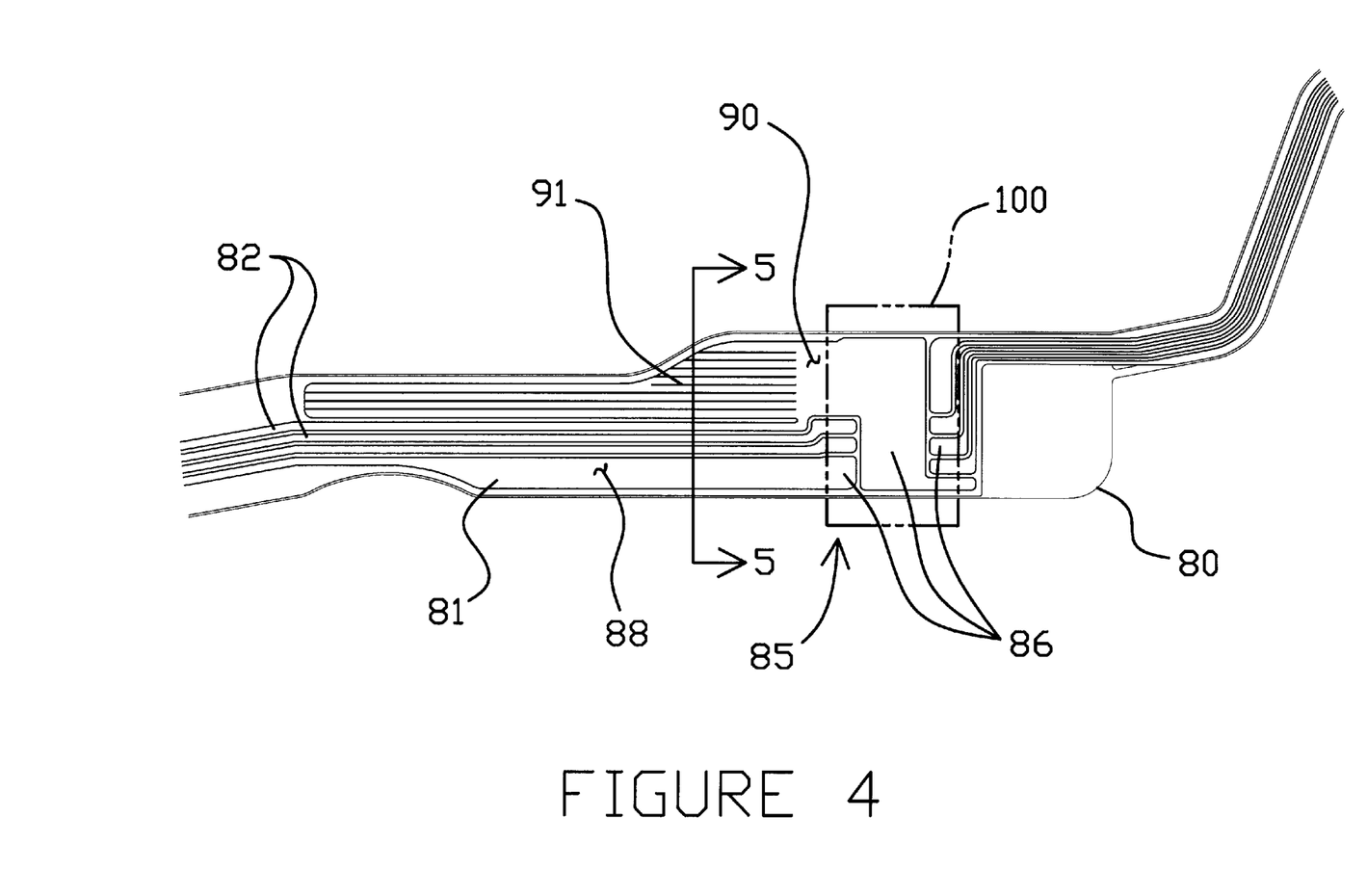
FIG. 4 is a detailed view of the chip mounting region of the flexure tail in FIG. 3 showing a plurality of heat dissipation structures integrally formed within a trace.

Referring again to FIG. 3, in this embodiment, a chip 100 (shown in phantom) is mounted adjacent to traces 82 of tail 80. Referring now also to FIG. 4, an enlarged detailed view of a portion of suspension tail 80 is shown. As stated above, conductive layer 81 is formed into a plurality of conductive traces 82 that provide a bonding area 85 for the chip 100. The bonding area 85 includes a plurality of bonding pads 86 that are larger areas of conductive material integrally formed with the traces 82. The bonding pads 86 are shaped and sized primarily to conform to and accommodate electrical connection to corresponding bonding areas (not shown) on the chip 100.

As described in the Background section above, however, mounting of the chip 100 on the tail 80, in relatively close proximity to a head slider, has the potential for creating problems in the disk drive due to heat generated by the chip 100. In order to dissipate this heat, the bonding pads 86 and traces 82 may be formed from material that is both electrically and thermally conductive. In addition, the bonding pads 86 may be formed as larger areas of conductive material than are necessary for electrical connection alone. To further dissipate heat from the chip 100, portions of the traces 82 adjacent the bonding area 85 may be formed as expanded areas of conductive material, such as those shown specifically for traces 88 and 90. These expanded areas greatly increase the two-dimensional surface area of thermally conductive material available to dissipate heat generated by the chip 100 mounted on the tail 80.

Figure 5:
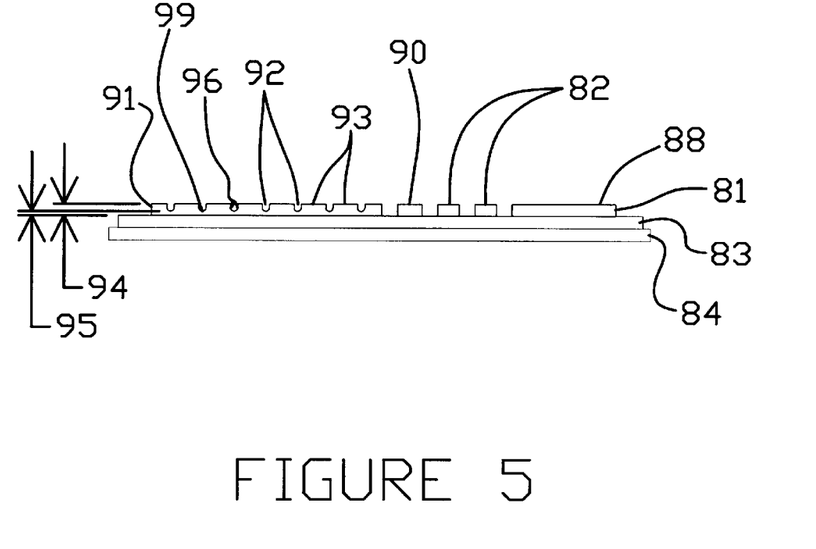
FIG. 5 is a cross-sectional view of the flexure tail in FIG. 4, taken along Line 5—5.

To additionally increase heat dissipation and take full advantage of the air flow present in the disk drive 2 due to rotation of the disk 4, the present invention provides for the integral creation of three-dimensional heat dissipation structures within these expanded trace areas, such as 88, 90. Referring now also to FIG. 5, in this embodiment, the trace 90 includes a heat dissipation area 91 formed with a plurality of heat fins 93 separated by valleys 92. The valleys 92 preferably only extend into the conductive layer 81 a portion of an overall thickness 94 of the layer 81, thereby providing conductive material for heat dissipation along both the sides 96 and bases 99 of the valleys 92. However, valleys 92 that extend through the entire thickness 94 of the conductive layer 81 are also possible. The heat dissipation area 91 with heat fins 93 greatly increase the three-dimensional surface area of thermally conductive material available to dissipate heat generated by the chip 100.

As shown, the valleys 92 are configured in a generally 'U' shape, with the sides 96 connected by a curved base 99. Alternatively, the valleys 92 may be configured in another shape, including but not limited to 'V' shapes, squares, rectangles, curves or other desired configuration, depending on the surface area desired, the method used for forming the valleys and/or other factors. Optionally, instead of channel type structures, the heat dissipation structures may be formed as a plurality of projections or indentations within the conductive layer 81, or as other three-dimensional structures that increase the three-dimensional surface area of the material.

The heat fins 93 are preferably formed by partial etching of the conductive layer 81. Etching to form the heat fins 93 may be conducted as a separate manufacturing operation on prior formed flexures or head suspensions, or etching of the heat fins 93 may be included as a process step in the flexure/head suspension formation process. Alternatively, partial etching techniques, such as that described in commonly owned U.S. Pat. No. 5,846,442 to Pasco, entitled: CONTROLLED DIFFUSION PARTIAL ETCHING, may be used to form not only the traces 52, 72, 82 for the entire flexure 40, 60, and tail 80, but also the heat fins 93 in a single etching process. This partial etching process allows for the formation of multiple areas of different thickness material in a single stage expose/etch process. Using this process, both the functional features of the component, such as the electrical and mechanical features, and the beneficial additive heat dissipation structures may be etched at the same time. This process makes it possible to simultaneously form varying traces of one thickness 94, such as 82, 88 and 90, along with the heat fins 93 separated by valleys 92 that are at a second thickness 95. Single step etching of the entire component, including the heat dissipation structures, provides for efficient and cost effective production of head suspensions.

Alternatively, other methods may be used to form heat fins 93 within the conductive layer 81. These methods may include, but are not limited to, laser ablation, coining and/or embossing. Optionally, the heat dissipation structures may be formed by additive methods, including but not limited to deposition or plating. The additive formation process may conducted in conjunction with an additive process for formation of the lead suspension, or may be conducted independently from formation of the lead suspension, such as, for example, after etching of the suspension laminate.

The number of heat fins 93 to be formed within heat dissipation area 91 will depend on the available surface area of conductive material and the limitations of the etching or other forming process used to form the fins 93. It has been found, however, that by forming as many heat fins 93 as possible within the heat dissipation area 91, the surface area available for heat dissipation may be increased on the order of about two times more than without heat fins 93. Heat dissipation by the heat dissipation area 91 is directly proportional to the surface area available. Therefore, twice as much heat dissipation is possible for a head suspension using the integral heat fins 93 of the present invention than a head suspension formed with only a two-dimensional increase in surface area of conductive material.

Although heat fins 93 are shown in this embodiment formed only in trace 90, it is to be understood that any and/or all of the traces 82 of the flexure/head suspension may have heat fins integrally formed within them. As shown in FIGS. 3–5, one trace 90 with a largely expanded area combined with a plurality of traces without expanded areas may be used. Alternately, multiple traces with expanded heat dissipation areas may be combined together. Determining which traces 82 should include expanded areas for heat dissipation and of those traces 82, which should have heat fins 93 formed within them, will depend on many factors. These factors include, but are not limited to: the available surface area of the component (i.e., flexure, tail, load beam) on which the traces are to be formed; the electrical function of the traces; a balance between the desired amount of thermally conductive material and the weight restrictions of the component; and the mechanical function of the component. The number, size and location of heat fins 93 formed within traces 82 may vary from one head suspension configuration to another, and all variations are within the spirit and scope of the present invention. Additionally, the heat fins 93 may be oriented at any angle relative to the longitudinal axis of the tail 80 or whatever component on which they are formed. The heat fins 93 may be provided in a transverse direction relative to the overall trace orientation, or may be provided at an angle relative to this orientation.

Although chip 100 is shown in this embodiment mounted on the tail 80 of flexure 60, it is to be understood that a chip may be mounted closer to a head slider, such as on flexure mounting region 42 shown in FIG. 2. In this situation, the traces 52 may be formed with expanded heat dissipation areas, some or all of which may be formed with heat fins. Placement of a chip in another location between the head slider 22 at the distal end of head suspension 10 and the end of the electrical connection, such as proximal end 89 of tail 80, is also possible and within the scope of the present invention. Wherever the chip is mounted on the head suspension, the traces may be configured to include expanded heat dissipation areas that are formed with heat fins in accordance with the present invention.

Figure 6:
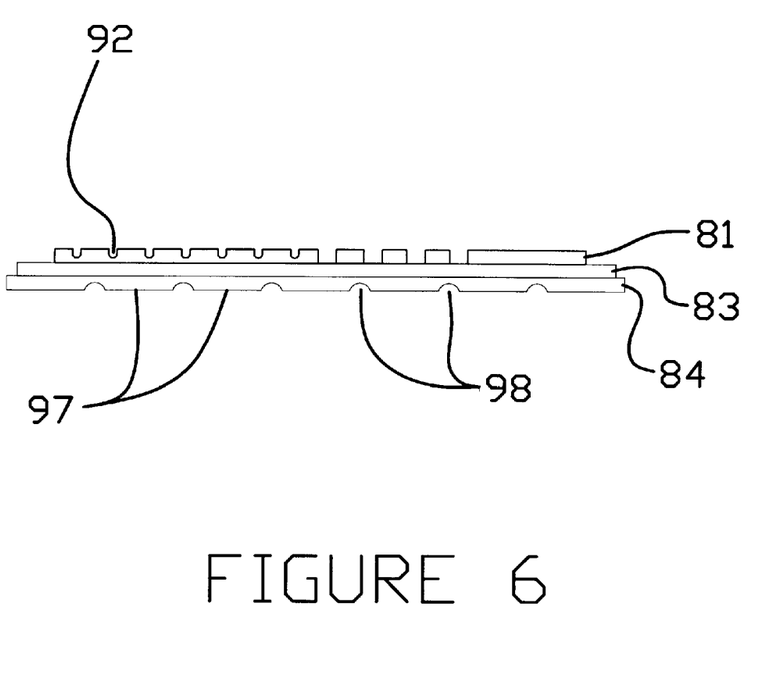
FIG. 6 is another embodiment shown as a cross-sectional view of the flexure tail in FIG. 4, taken along Line 5—5, showing a second set of heat dissipation structures integrally formed within the support layer.

Referring now to FIG. 6, additional dissipation of heat in the region of the chip 100 may also be achieved by the formation of secondary heat fins 97 in the support or stainless steel layer 84. These secondary heat fins 97 are configured in the same manner as heat fins 93, shown running along the length of the component, by the formation of a plurality of valleys 98 spaced apart across the width of the support layer 84. In a manner similar to valleys 92, valleys 98 may be configured in any of a number of desired shapes, including a curved shape, as shown, or in any of a number of other three dimensional structures, such as projections or indentations. Formation of the secondary heat fins 97 may be achieved using the same type of etching techniques described above for heat fins 93. Alternatively, the secondary heat fins 97 may be configured to run transverse to the heat fins 93 (not shown), such that the valleys 98 run across the width of the component, or at some other angle with respect to the heat fins 93.

Figure 7:
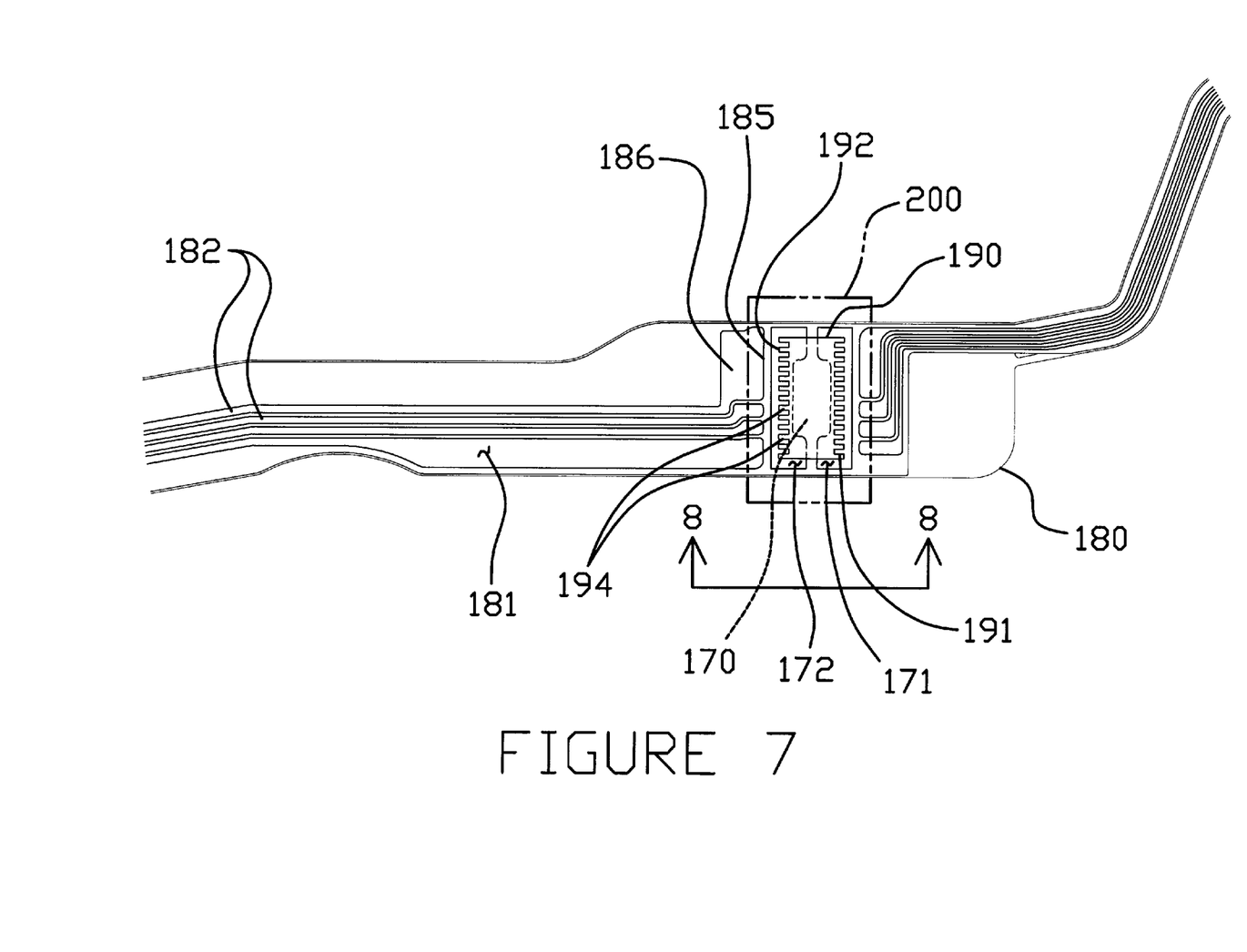
FIG. 7 is a detailed view of the chip mounting area of another embodiment of a flexure tail having a heat dissipation structure formed in the conductive layer as a pad supported by a bridge within the support layer.

Referring now to FIG. 7, another embodiment of a head suspension 110 is shown as a detailed view of a chip 200 (shown in phantom) mounted to a tail 180. Tail 180 similarly includes a conductive layer 181 formed into a plurality of traces 182, an insulating layer 183 and a support layer 184. In this embodiment, a bonding area 185 for the chip 200 includes a plurality of bonding pads 186 that are larger areas of conductive material integrally formed with the traces 182. The bonding pads 186 are shaped and sized primarily to conform to and accommodate electrical connection to corresponding bonding areas (not shown) on the chip 200.

In addition, the bonding area 185 includes a heat dissipation pad 190 formed in the conductive layer 181 between the traces 182 and in an area under the chip 200. The pad 190 is separate from the traces 182, and may or may not be in electrical contact with the chip 200. The pad 190 is configured as a generally rectangular portion of conductive material having a plurality of fingers 194 along each longitudinal side 191, 192. It is to be understood, however, that other configurations and/or orientations of the pad are also possible, including but not limited to formation without fingers, and or orientation with the fingers along the lateral sides of the pad.

The pad 190 is supported by a bridge 170 formed within the support layer 184. The bridge 170 is a portion of the support material that remains after formation of apertures 171, 172 within the support layer 184. The bridge 170, as shown, supports the pad 190 but leaves portions of the pad 190, such as the fingers 194, exposed over the apertures 171, 172. The insulating layer 183 in the bonding area 185 preferably underlies the conductive traces 182 and bonding pads 186, and underlies the heat dissipation pad 190 but is configured to correspond in shape and size to the bridge 170.

Figure 8:
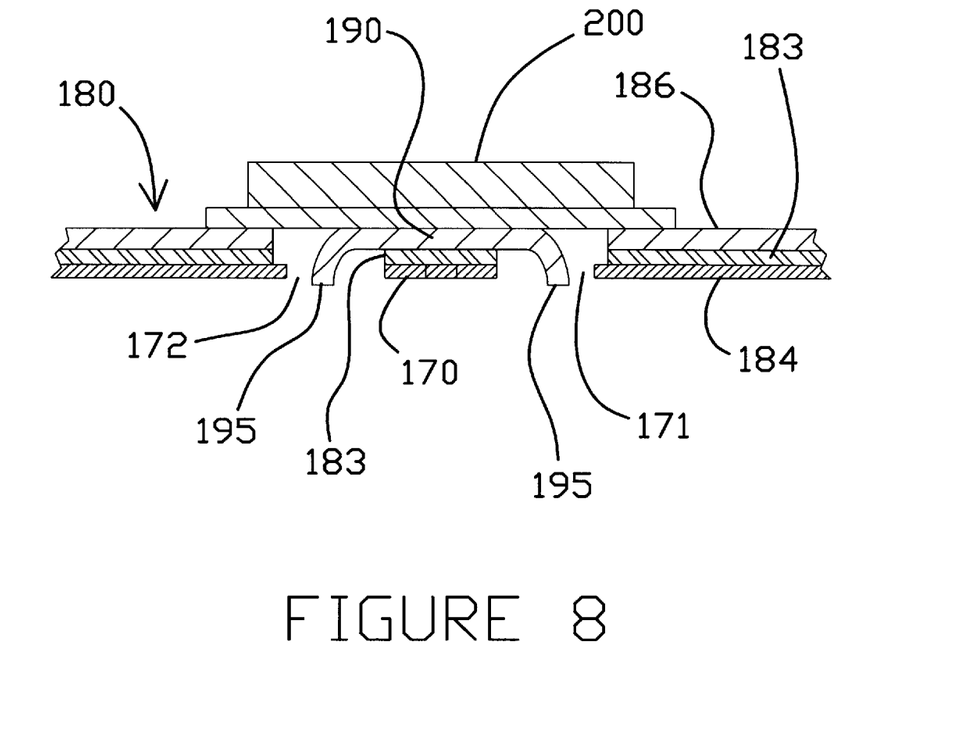
FIG. 8 is a side elevation view of the chip and heat dissipation structure of FIG. 7 showing heat fins formed within the pad extending through the support layer.

Referring now also to FIG. 8, a side view of the bonding area 185 is shown with the chip 200 mounted to the tail 180. After formation of the pad 190 within the conductive layer 181 and formation of the apertures 171, 172 and thus the bridge 170 within the support layer 184, the sides of the pad 190, such as longitudinal sides 191, 192 may be bent or otherwise formed to create three dimensional heat fins 195 that are integral to the conductive layer 181. The heat fins 195 are configured to extend out of the plane of the remainder of the pad 190, with the apertures 171, 172 providing clearance for both formation and protrusion of the heat fins 195 through the support layer 184. These three dimensional heat dissipation structures provide increased heat dissipation, taking advantage of air flow available within the disk drive unit. When the pad 190 is configured with edge fingers 194, the heat fins 195 include a plurality of heat fin fingers (not shown) to additionally increase surface area and aide in dissipating heat from the chip 200.

As mentioned above, the pad 190 may be oriented longitudinally, as shown in FIGS. 7 and 8, or may be oriented transversely from that position. The bridge 170 may then be oriented in a manner suitable to support the configuration and orientation of the pad 190, in order to accommodate the formation of the heat fins 195. Other configurations and orientations of the bridge, pad and heat fins may also be possible, and are within the scope and spirit of the present invention.

Creation of the pad 190 may be accomplished simultaneously with formation of the traces 182, by etching, partial etching or other suitable process. Creation of the bridge 170 may be accomplished during formation of the remainder of the support layer 184. The heat fins 195 may then be formed in an additional manufacturing step during production of the head suspensions.

The present invention provides three-dimensional heat dissipation structures, such as heat fins, that are conveniently formable within the already available conductive layer of a head suspension. Wherever a chip is mounted, whether it be on a tail or directly on a flexure, portions of the conductive layer may be configured to include one or more expanded areas of conductive material, which may then be formed into heat dissipation structures. These portions may be included as part of the conductive traces, or may be configured as non-electrically conductive regions. By increasing the surface area available for heat dissipation three-dimensionally in heat critical areas, the present invention allows for as much as double the heat dissipation provided by only two-dimensional areas. Use of available partial etching techniques makes it possible to integrally form the heat dissipation structures simultaneously with the formation of the conductive traces or other conductive layer features, thereby eliminating the need for additional processing steps and additional material, thus reducing the costs of providing adequate heat dissipation on the head suspension. Additional heat dissipation may also be achieved by formation of additional heat dissipation structures within the support layer, such as the spring metal layer, in the region of the chip and conductive layer heat dissipation structures. The present invention makes it possible to achieve adequate heat dissipation in the region of a chip on a head suspension in a cost effective and reliable manner, and thus is a significant improvement over current heat dissipation techniques.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A head suspension or head suspension component including a spring metal support layer, an insulating layer and a conductive layer, the conductive layer comprising an integrally formed three dimensional heat dissipation structure for dissipating heat in a region of the head suspension or head suspension component.

2. The head suspension or head suspension Component of claim 1, further including an integrated circuit chip mounting region in the conductive layer for receiving an integrated circuit chip, and wherein the heat dissipation structure is formed in the conductive layer adjacent the integrated circuit chip mounting region.

3. The head suspension or head suspension component of claim 1, wherein the heat dissipation structure comprises a plurality of three-dimensional projections integrally formed within the conductive layer.

4. The head suspension or head suspension component of claim 1 wherein the heat dissipation structure comprises a plurality of three-dimensional indentations integrally formed within the conductive layer.

5. The head suspension or head suspension component of claim 1, wherein the conductive layer further comprises at least one conductive trace and wherein the heat dissipation structure comprises heat fins integrally formed within the trace.

6. The head suspension or head suspension component of claim 5, wherein the heat fins comprise side walls separated by valleys formed within the conductive layer.

7. The head suspension or head suspension component of claim 6, wherein a depth of at least one valley is less than a depth of the conductive trace.

8. The head suspension or head suspension component of claim 6, wherein at least one valley is curved in shape.

9. The head suspension or head suspension component of claim 5, wherein at least a portion of the heat fins are configured to extend substantially longitudinally along the head suspension or head suspension component.

10. The head suspension or head suspension component of claim 5, wherein the head suspension or head suspension component has a longitudinal axis and wherein at least a portion of the heat fins are configured to extend at an angle relative to the longitudinal axis of the head suspension or head suspension component.

11. The head suspension or head suspension component of claim 10, wherein at least one portion of the heat fins are configured to extend at a first angle and at least another portion of the heat fins are configured to extend at a second angle.

12. The head suspension or head suspension component of claim 5, wherein the conductive layer further comprises a plurality of conductive traces, at least one of the plurality of conductive traces configured to include an expanded heat dissipation area, and wherein the heat fins are integrally formed within the expanded heat dissipation area of the at least one conductive trace.

13. The head suspension or head suspension component of claim 5, wherein the heat fins are formed within the trace using an etching process.

14. The head suspension or head suspension component of claim 13, wherein the etching process comprises a partial etching process and wherein the trace and the heat fins within the trace are formed simultaneously.

15. The head suspension or head suspension component of claim 1, wherein the heat dissipation structure comprises a first heat dissipation structure, and further comprising a second heat dissipation structure integrally formed within the support layer adjacent the first heat dissipation structure.

16. The head suspension or head suspension component of claim 15, wherein the second heat dissipation structure comprises a plurality of three-dimensional projections formed within the support layer.

17. The head suspension or head suspension component of claim 15, wherein the second heat dissipation structure comprises a plurality of three-dimensional indentations formed within the support layer.

18. The head suspension or head suspension component of claim 15, wherein the second heat dissipation structure comprises second heat fins.

19. The head suspension or head suspension component of claim 18, wherein the second heat fins comprise side walls separated by valleys formed within the support layer.

20. The head suspension or head suspension component of claim 18, wherein the second heat fins are formed within the support layer using an etching process.

21. The head suspension or head suspension component of claim 20, wherein the etching process comprises a partial etching process and wherein the support layer and the second heat fins within the support layer are formed simultaneously.

22. The head suspension or head suspension component of claim 18, wherein the second heat fins are configured to extend generally longitudinally along the head suspension or head suspension component.

23. The head suspension or head suspension component of claim 18, wherein the second heat fins are configured to extend at an angle relative to the first heat dissipation structure.

24. The head suspension or head suspension component of claim 1, wherein the heat dissipation structure comprises a heat dissipation pad formed within the conductive layer as a generally planar region of conductive material, the pad including a plurality of protruding heat fins formed integrally with the pad, the protruding heat fins configured to extend out of plane with the remainder of the pad.

25. The head suspension or head suspension component of claim 24, wherein the support layer includes a bridge flanked by apertures, the bridge supporting the pad and the apertures providing clearance for the plurality of protruding heat fins.

26. The head suspension or head suspension component of claim 25, wherein the heat dissipation structure comprises a first heat dissipation structure and further comprising a second heat dissipation structure integrally formed within the support layer.

27. The head suspension or head suspension component of claim 25, wherein the second heat dissipation structures comprise support layer heat fins.

28. The head suspension or head suspension component of claim 27, wherein the support layer heat fins comprise side walls separated by valleys formed within the support layer.

29. The head suspension or head suspension component of claim 27, wherein the support layer heat fins are formed using an etching process.

30. The head suspension or head suspension component of claim 1, wherein the heat dissipation structures are formed within the conductive layer using an etching process.

31. A method of manufacturing a head suspension or head suspension component having a heat dissipation structure, the method comprising the steps of:
    providing a laminated head suspension material including a conductive layer, an insulating layer and a spring metal support layer; and
    forming the laminated material to create predetermined support layer features, predetermined insulating layer features and predetermined conductive layer features for the desired head suspension or head suspension component, the conductive layer features including three dimensional heat dissipation structures integrally created within the conductive layer for dissipating heat in a region of the head suspension or head suspension component.

32. The method of claim 31, wherein the step of forming comprises multiple etching processes to create the heat dissipation structures in the conductive layer.

33. The method of claim 31, wherein the conductive layer includes at least one conductive trace, and wherein the step of forming further comprises using a partial etching technique to simultaneously etch both the trace and the heat dissipation structures into the trace.

34. The method of claim 31, further comprising the step of forming heat dissipation structures integrally within the support layer in an area adjacent the heat dissipation structures formed within the conductive layer.

35. The method of claim 34, wherein the further step of forming comprises using a partial etching technique to simultaneously etch both the predetermined support layer features and the heat dissipation structures into the support layer.

36. A method of manufacturing a head suspension or head suspension component having a heat dissipation structure, the method comprising the steps of:
    forming a multiple layer head suspension material including a conductive layer, an insulating layer and a spring metal support layer; and
    forming the material to create predetermined support layer features, predetermined insulating layer features and predetermined conductive layer features for the desired head suspension or head suspension component, the conductive layer features including three dimensional heat dissipation structures integrally created within the conductive layer for dissipating heat in a region of the head suspension or head suspension component.

37. The method of claim 36, wherein the step of forming the material comprises material depositing processes to create the heat dissipation structures in the conductive layer.

38. The method of claim 36, wherein the conductive layer includes at least one conductive trace, and wherein the step of forming the material further comprises using a material deposition technique to contemporaneously deposit both the trace and the heat dissipation structures onto the trace.

39. The method of claim 36, further comprising the step of forming heat dissipation structures integrally within the support layer in an area adjacent the heat dissipation structures formed within the conductive layer.

40. The method of claim 39, wherein the further step of forming heat dissipation structures comprises using a material deposition technique to contemporaneously deposit both the predetermined support layer features and the heat dissipation structures onto the support layer.

41. A head suspension or head suspension component including a spring metal support layer, an insulating layer and a conductive layer, the conductive layer having an integrated circuit chip mounting region for receiving an integrated circuit chip including at least one conductive pad configured to electrically connect to at least one electrical connector on the chip, with the conductive layer including at least one conductive trace in electrical connection with the at least one conductive pad to conduct electrical signals to and from the chip, the conductive layer comprising an integral three dimensional heat dissipation structure formed in the conductive trace and positioned adjacent the chip mounting region for dissipating heat from the chip.

42. A method of manufacturing a head suspension or head suspension component having a heat dissipation structure, the method comprising the steps of:

providing a laminated head suspension material including a conductive layer, an insulating layer and a spring metal support layer; and forming the laminated material to create predetermined support layer features, predetermined insulating layer features and predetermined conductive layer features for the desired head suspension or head suspension component, the conductive layer features including an integrated circuit chip mounting region for receiving an integrated circuit chip, the chip mounting region including at least one conductive pad configured to electrically connect to at least one electrical connector on the chip, with the conductive layer also including at least one conductive trace in electrical connection with the at least one conductive pad to conduct electrical signals to and from the chip, the conductive layer features further including an integral three dimensional heat dissipation structure formed in the conductive trace and positioned adjacent the chip mounting region for dissipating heat from the chip.

* * * * *